United States Patent
Markel et al.

(10) Patent No.: US 9,170,914 B2
(45) Date of Patent: Oct. 27, 2015

(54) INTERFACE MONITORING DEVICE FOR AN INTERFACE PORT AND USE OF AN INTERFACE MONITORING DEVICE

(75) Inventors: Ottwald Markel, Augsburg (DE); Rudolf Häußermann, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 28 days.

(21) Appl. No.: 13/878,866

(22) PCT Filed: Sep. 14, 2011

(86) PCT No.: PCT/EP2011/065952
§ 371 (c)(1),
(2), (4) Date: Jun. 10, 2013

(87) PCT Pub. No.: WO2012/048981
PCT Pub. Date: Apr. 19, 2012

(65) Prior Publication Data
US 2013/0246667 A1     Sep. 19, 2013

(30) Foreign Application Priority Data

Oct. 13, 2010   (DE) .................... 10 2010 048 352

(51) Int. Cl.
| G06F 15/177 | (2006.01) |
| G06F 11/30 | (2006.01) |
| G06F 13/40 | (2006.01) |

(52) U.S. Cl.
CPC ........ *G06F 11/3089* (2013.01); *G06F 13/4081* (2013.01)

(58) Field of Classification Search
CPC .......................... G06F 11/3089; G06F 13/4081
USPC ........................................................ 710/15
See application file for complete search history.

(56) References Cited

U.S. PATENT DOCUMENTS

| 8,234,433 B2 * | 7/2012 | Markel et al. ................. 710/302 |
| 2002/0169915 A1 | 11/2002 | Wu |

(Continued)

FOREIGN PATENT DOCUMENTS

| DE | 10 2008 035 103 A1 | 2/2010 |
| EP | 1 758 029 A1 | 2/2007 |

(Continued)

OTHER PUBLICATIONS

Hewlett-Packard et al. Universal Serial Bus 3.0 Specification (including errata and ECNs through May 1, 2011). Jun. 6, 2011. Revision 1.0. pp. 5-14, 6-37, 6-38.*

(Continued)

*Primary Examiner* — Henry Tsai
*Assistant Examiner* — John Roche
(74) *Attorney, Agent, or Firm* — DLA Piper LLP (US)

(57) ABSTRACT

An interface monitoring apparatus for an interface port for connecting a peripheral device to an interface chip by at least one first data line includes a capacitive element arranged between the interface chip and the interface port and which capacitively couples the first data line to the interface chip, a first monitoring circuit coupled to the first data line at the interface port and which monitors at least one device-end termination of the first data line and provides a first control signal in the event of it being identified that a termination for the first data line is not present, and a first deactivation circuit that permanently stops data traffic via the first data line of the interface port until the interface monitoring apparatus is reset when the first control signal has been provided by the first monitoring circuit.

18 Claims, 6 Drawing Sheets

(56) References Cited

U.S. PATENT DOCUMENTS

| | | | |
|---|---|---|---|
| 2003/0056051 A1 | 3/2003 | Burke et al. | |
| 2007/0184713 A1* | 8/2007 | Haslbock et al. | 439/583 |
| 2007/0259542 A1 | 11/2007 | Yang et al. | |
| 2010/0023744 A1* | 1/2010 | Markel et al. | 713/2 |
| 2010/0077262 A1* | 3/2010 | Morosawa et al. | 714/48 |
| 2011/0058424 A1* | 3/2011 | Goda et al. | 365/185.19 |

FOREIGN PATENT DOCUMENTS

| | | |
|---|---|---|
| JP | 2007-215058 | 8/2007 |
| JP | 2008-263299 | 10/2008 |
| JP | 2009-545086 | 12/2009 |
| WO | 2008/011727 | 1/2008 |

OTHER PUBLICATIONS

Hewlett-Packard et al. Universal Serial Bus 3.0 Specification (including errata and ECNs through May 1, 2011), Jun. 6, 2011. Revision 1.0. pp. 3-2, C-6 (in addition to previously-cited pages).*

"Universal Serial Bus 3.0 Specification," Internet Citation, Nov. 12, 2008, XP007906852, http://www.usb.org/developers/docs, (4 parts).

English translation of Japanese Office Action mailed Apr. 15, 2014 from corresponding Japanese Patent Application No. 2013-533140.

* cited by examiner

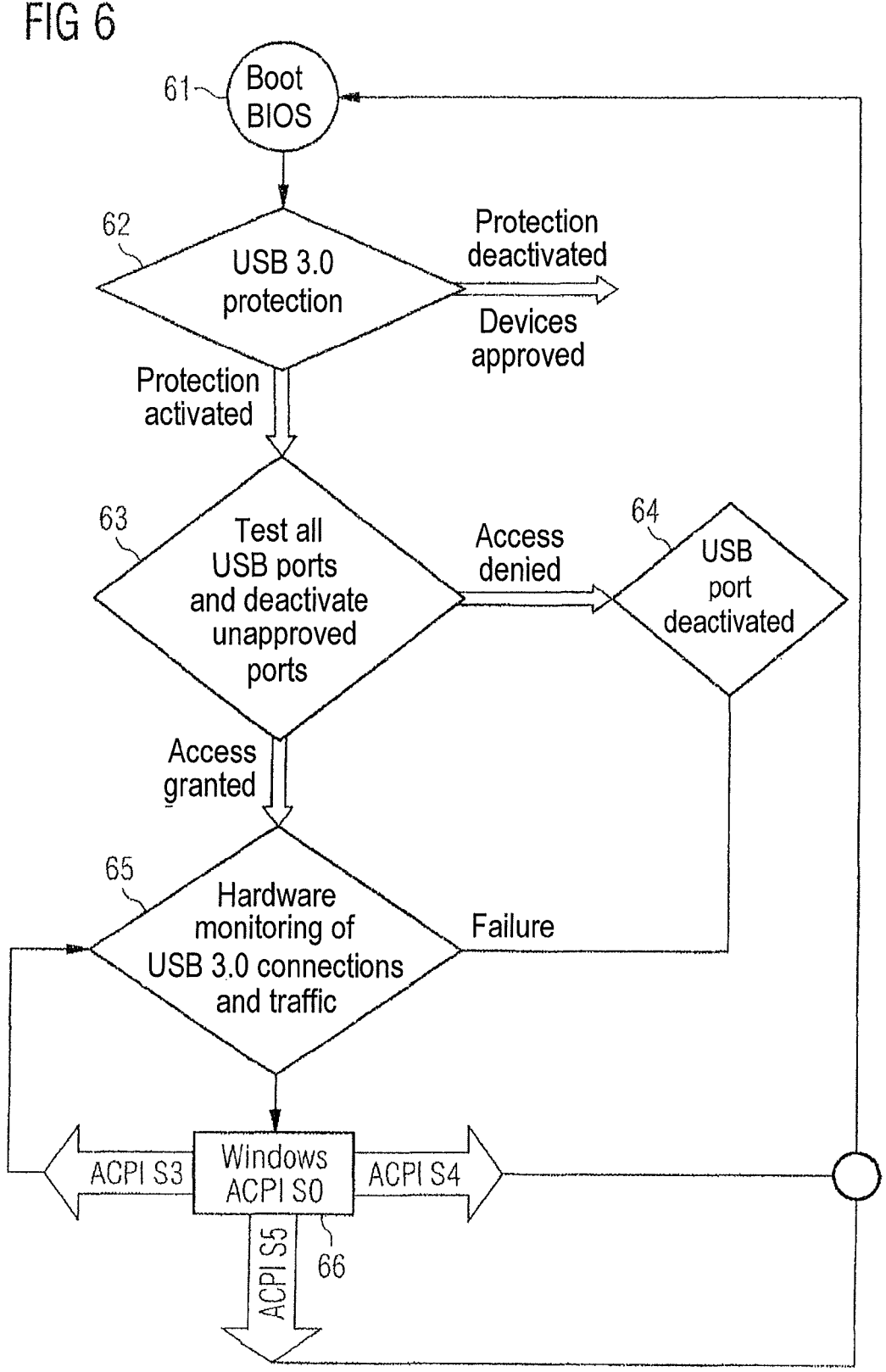

INTERFACE MONITORING DEVICE FOR AN INTERFACE PORT AND USE OF AN INTERFACE MONITORING DEVICE

TECHNICAL FIELD

This disclosure relates to an interface monitoring apparatus for an interface port for connecting a peripheral device by at least one first data line. The disclosure relates to the use of such an interface monitoring apparatus in a USB host adapter.

BACKGROUND

USB interfaces and technically similar interfaces support what is known as "hot plugging," that is to say the connection and removal of peripheral devices to/from a host adapter during operation of the host adapter and/or the peripheral device. At the same time, they support a multiplicity of different device types such as mice and keyboards, memory sticks, external hard disks and so on.

Particularly when external mass storage media are connected to a running computer system, however, there is the danger that the system security of a host system is put at risk. By way of example, the connection of USB memory sticks may transfer viruses or other malware to the host computer system. In addition, it is also a very simple matter to steal relatively large volumes of data.

To counteract these and similar problems, monitoring and filter mechanisms are known which prevent the connection of certain device types to a computer system.

An interface monitoring apparatus for at least one differential interface port having a positive and a negative data line D+ and D− for connecting a peripheral device is known from DE 10 2008 035 103 A1. DE '103 discloses particularly an interface monitoring apparatus that monitors an interface port based on USB specification 2.0. The circuit described therein is particularly suitable for monitoring and deactivating data lines which use continuous, differential signaling.

The USB 2.0 standard permits data transfer at a data transfer rate of no more than 480 Mbit/s. To permit data transfer at even higher data transfer rates, the subsequent USB 3.0 standard was provided with a changed physical interface port which permits data transfer at up to 5 Gbit/s. In particular, in addition to a bidirectional, differential line pair based on the USB 2.0 standard, two additional capacitively coupled, unidirectional and differential line pairs RX (Super Speed Receiver differential pair) and TX (Super Speed Transmitter differential pair) were provided which together permit bidirectional high speed communication between a USB host adapter and a USB device connected thereto. Furthermore, the USB 3.0 standard comprises further changes which relate particularly to the energy management of devices connected to a USB port.

Known interface monitoring apparatus has only limited suitability for monitoring interface ports based on the new USB 3.0 standard. The reason is that, first, the signaling used on the additional unidirectional data lines is fundamentally different than the signaling via the bidirectional data lines D+ and D− based on the USB 2.0 specification on account of the capacitive coupling of the data lines. Furthermore, the interface monitoring apparatus described in a USB 2.0 specification does not recognize the signaling via the additional differential line pairs RX and TX and, therefore, initiates unintentional deactivation of the interface port when USB 3.0 devices are connected.

It could therefore be helpful to provide an improved interface monitoring apparatus which is relatively simple design and able to ensure the intended protective effect in all cases. The interface monitoring apparatus is particularly meant to be suitable to securely and reliably monitor disconnection of devices at capacitively coupled interface ports, for example, based on USB specification 3.0.

SUMMARY

We provide an interface monitoring apparatus for an interface port for connecting a peripheral device to an interface chip by at least one first data line including a capacitive element arranged between the interface chip and the interface port and which capacitively couples the first data line to the interface chip, a first monitoring circuit coupled to the first data line at the interface port and which monitors at least one device-end termination of the first data line and provides a first control signal in the event of it being identified that a termination for the first data line is not present, and a first deactivation circuit that permanently stops data traffic via the first data line of the interface port until the interface monitoring apparatus is reset when the first control signal has been provided by the first monitoring circuit.

We also provide a USB host adapter having at least one USB interface port for connecting a peripheral device to an interface chip by at least one first data line including an interface monitoring apparatus including a capacitive element arranged between the interface chip and the interface port and which capacitively couples the at least one first data line to the interface chip, a first monitoring circuit coupled to the first data line at the interface port and monitors at least one device-end termination of the first data line and provides a first control signal in the event of it being identified that a termination for the first data line is not present, and a first deactivation circuit that permanently stops data traffic via the first data line of the interface port until the interface monitoring apparatus is reset when the first control signal has been provided by the first monitoring circuit.

BRIEF DESCRIPTION OF THE DRAWINGS

FIG. 6 shows a flowchart for schematically presenting the control of a USB host adapter in different operating states.

LIST OF REFERENCE SYMBOLS

Figure 1:
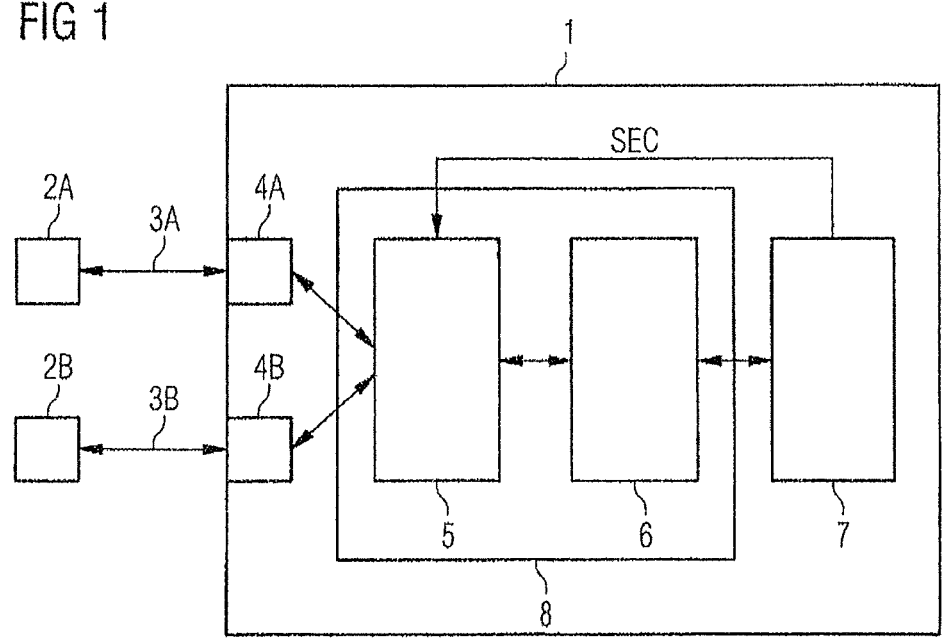
FIG. 1 shows an arrangement including a computer system with a USB hot adapter.

1 Computer system
2 Peripheral device
3 USB connection
4 Interface port
5 Interface monitoring apparatus
6 Interface chip
7 BIOS chip
8 USB host adapter
20 First monitoring circuit
21 First differential wire pair
21A/B First data line 22 Reception circuit
23 Terminating resistor
30 Input
31 Second differential wire pair
31A/B Second data line
32 Third differential wire pair
32A/B Third data line
33 Second monitoring circuit
34 Logic circuit
35 Deactivation circuit

DETAILED DESCRIPTION

We provide an interface monitoring apparatus for an interface port to connect a peripheral device to an interface chip by at least one first data line. The apparatus may comprise a capacitive element arranged between the interface chip and the interface port and capacitively couples the first data line to the interface chip. The interface monitoring apparatus comprises a first monitoring circuit coupled to the first data line at the interface port and set up to monitor at least one device-end termination of the first data line and provide a first control signal in the event of it being identified that a termination for the first data line is not present. The interface monitoring apparatus furthermore may comprise a first deactivation circuit set up to permanently stop the data traffic via the first data line of the interface port until the interface monitoring apparatus is reset when the first control signal has been provided by the first monitoring circuit.

The interface monitoring apparatus may account for the circumstance that the higher data transfer rate, for example, based on the USB 3.0 standard, is achieved by virtue of the provision of capacitive coupling between a host adapter and an interface port connected thereto. The capacitive element prompts decoupling of a DC component of the first data line. At the same time, the capacitive element achieves coupling of an AC component.

The monitoring circuit makes use of the capacitive coupling by monitoring a device-end termination of the first data line downstream of the capacitive element, that is to say at the interface port or a peripheral device connected thereto. Monitoring the termination of the data line is therefore independent of the high frequency signaling used via the first data line.

The monitoring circuit may be set up to determine an output impedance for the at least one first data line and provide the first control signal in the event of a predetermined threshold value for the output impedance being exceeded. Determination of an output impedance for the at least one data line allows simple and secure identification of a termination of the first data line and, hence, the connection and disconnection of a peripheral device.

The interface monitoring apparatus may be characterized by a circuit that produces a reference voltage and a comparator that compares the reference voltage produced with a voltage level which depends on the output impedance of the at least one first signal line. The compareson of a reference voltage with a voltage level which depends on an output impedance of the at least one first data line allows simple determination of the output impedance of the first data line.

The interface monitoring apparatus may have at least one second monitoring circuit coupled to a third data line of the interface port and set up to monitor activity on the at least one third data line and provide a second control signal in the event of it being identified that an activity is not present on the third data line, wherein transfer of data via the third interface line is independent of the transfer of data via the first data line.

Such an interface monitoring apparatus is particularly suitable for use in host adapters to which devices both based on the USB 2.0 specification and based on the USB 3.0 specification can be connected. Since signaling based on the USB 2.0 and USB 3.0 specifications takes place via separate data lines, separate monitoring of the different data lines is advantageous to identify disconnection of USB devices from such an interface irrespective of their speed class.

The first deactivation circuit may be set up to permanently stop the data traffic via the first and third data lines of the interface port only when the first monitoring circuit provides the first control signal and the second monitoring circuit provides the second control signal simultaneously. Such a deactivation circuit makes it possible to prevent the unintentional initiation of the deactivation circuit in the event of inactivity on just one of the two different data lines.

The interface monitoring apparatus may be characterized by a second deactivation circuit set up to permanently stop the data traffic via the third data line of the interface port until the interface monitoring apparatus is reset when the second control signal is provided by the second monitoring circuit. If it is possible to preclude a change between signaling via the different data lines from the outset, the first and second monitoring and deactivation circuits can also be operated independently of one another.

The interface monitoring apparatus described is particularly suitable for use in a USB host adapter having at least on USB interface port. A USB interface port has at least one first and one second differential wire pair to simultaneously send and receive data at a first speed and a third differential wire pair to randomly send or receive data at at least one second speed.

Further advantages are described in the detailed description of examples which follows.

Different examples are explained in detail below with reference to the figures. In this case, the same reference symbols are used for components which are the same or similar in different examples.

FIG. 1 shows an arrangement comprising a computer system 1 and two peripheral devices 2A and 2B connected to the computer system 1. The peripheral devices 2A and 2B connect to the computer system 1 by a respective USB connection 3A and 3B. The USB device 2A is a peripheral device based on the USB 2.0 standard. The peripheral device 2B in the example is a peripheral device based on the USB 3.0 standard.

The computer system 1 comprises a first interface port 4A and a second interface port 4B, to which the USB connections 3A and 3B are connected. The interface ports 4A and 4B connect to an interface monitoring apparatus 5. The interface monitoring apparatus 5 connects to an interface chip 6 which actuates the interface ports 4A and 4B and controls the data interchange between the peripheral devices 2A and 2B and the computer system 1. By way of example, it is what is known as an I/O controller hub (ICH) or a separate interface controller. A control signal SEC can be used by the BIOS chip 7 to activate the monitoring apparatus 5. A further interaction by the BIOS during monitoring of the interface ports 4A and 4B is not required. The interface chip 6 connects to a BIOS chip 7 with program code to initialize the interface ports 4A and 4B.

Figure 2:
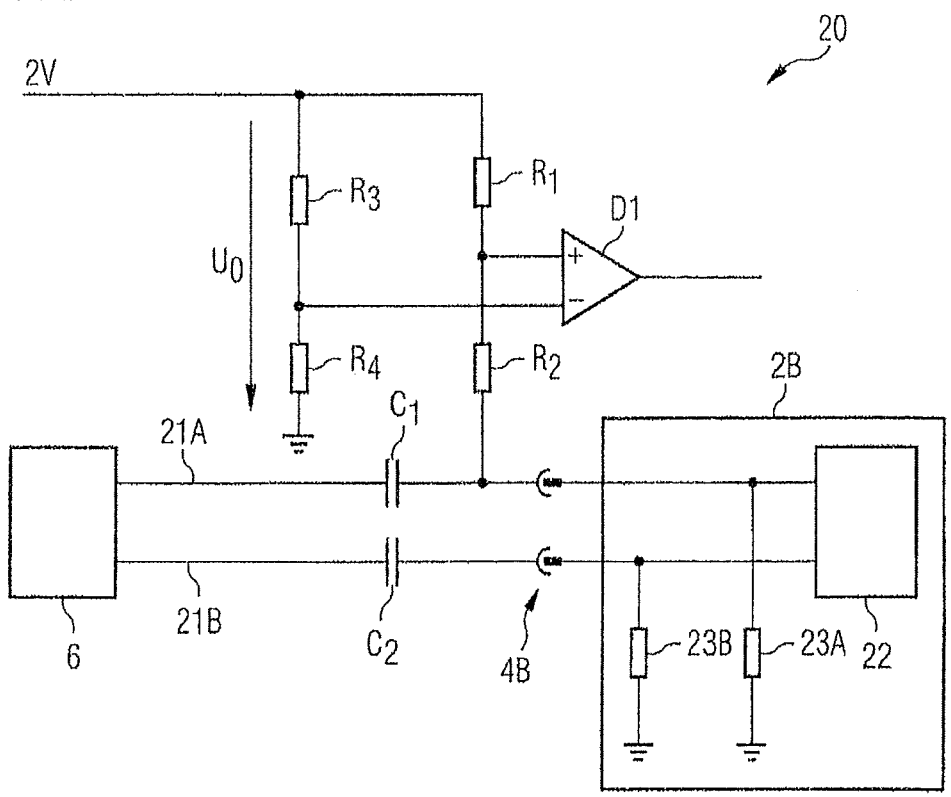
FIG. 2 shows a schematic illustration of a first monitoring circuit.

The interface chip 6 forms the core of a USB host adapter 8. Depending on the construction, however, the interface monitoring apparatus 5 is also part of the host adapter 8, as shown in FIG. 2. Optionally, the interface ports 4A and 4B themselves and/or further portions for actuation such as the BIOS chip 7, may also be part of the host adapter 8.

A way of monitoring disconnection of the peripheral device 2A based on the USB 2.0 standard from the first interface port 4A has already been described in detail in DE 10 2008 035 103 A1, with reference being made to the subject matter thereof. The description below therefore relates essentially to monitoring the peripheral device 2B based on the USB 3.0 specification to disconnect from the second interface port 4B.

FIG. 2 shows a first monitoring circuit 20 that monitors a first data line 21A. In the example, the first data line 21A is a line from a first differential wire pair 21 to transfer data from the interface chip 6 to the peripheral device 2B based on the USB 3.0 standard.

As can be seen from FIG. 2, the first data line 21A comprises a capacitor C1 to capacitively couple the interface chip 6 to the interface port 4B. The capacitor C1 simultaneously prompts decoupling of a DC component and coupling of an AC component between the interface chip 6 and the interface port 4B or a peripheral device 2B which may be connected thereto.

As is likewise evident from FIG. 2, the USB 3.0 specification provides for device-end termination of both data lines 21A and 21B of the differential wire pair 21. Both the first data line 21A and the associated further data line 21B connect to a ground potential via a respective terminating resistor 23A or 23B. In addition, the data lines 21A and 21B connect to a device-end reception circuit 22.

To identify connection of the peripheral device 2B and, indirectly thereby, also disconnection of the USB device 2B from the interface port 4B, the first monitoring circuit 20 comprises a voltage divider having the resistors R3 and R4 to provide a reference voltage on the basis of a provided voltage U0.

The voltage U0 is 2 V, for example, and is therefore below the maximum voltage of 2.2 V—required on the basis of the USB standard—to signal via the first data line 21A. The voltage divider having the resistors R3 and R4 provides a reference voltage of 1.9 V, for example, at the input 6 of a comparator D1. At the same time, a second voltage divider comprising the resistors R1 and R2 determines a voltage drop at the interface port 4B and, hence, indirectly the output impedance of the first data line 21A downstream of the capacitor C1.

If, as FIG. 2 shows, a peripheral device 2B connects to the relevant interface port 4B, then the first data line 21A connects to the ground potential via the terminating resistor 23A downstream of the capacitor C1. The resistor R2 carries a current, with the result that the voltage level at the non-inverted input of the comparator D1 falls below a reference level and the output of the comparator D1 adopts a low output level. If, by contrast, there is no peripheral device 2B connected to the second interface port 4B then the output of the first data line 21A changes to high impedance downstream of the capacitor C1. This means that the resistor R2 of the voltage divider carries no current and the level at the non-inverting input of the comparator D1 rises to the operating voltage U0. Therefore, the output of the comparator D1 switches to a high logic level.

The reference voltage in the monitoring circuit 20 is expediently chosen such that the maximum DC voltage—provided during operation based on the USB 3.0 standard—on the first data line 21A of approximately 500 mV is taken into account. In addition, the use of high-value resistors R1 and R2 makes it possible to avoid impairment of the signal quality via the first data line 21A.

Figure 3:
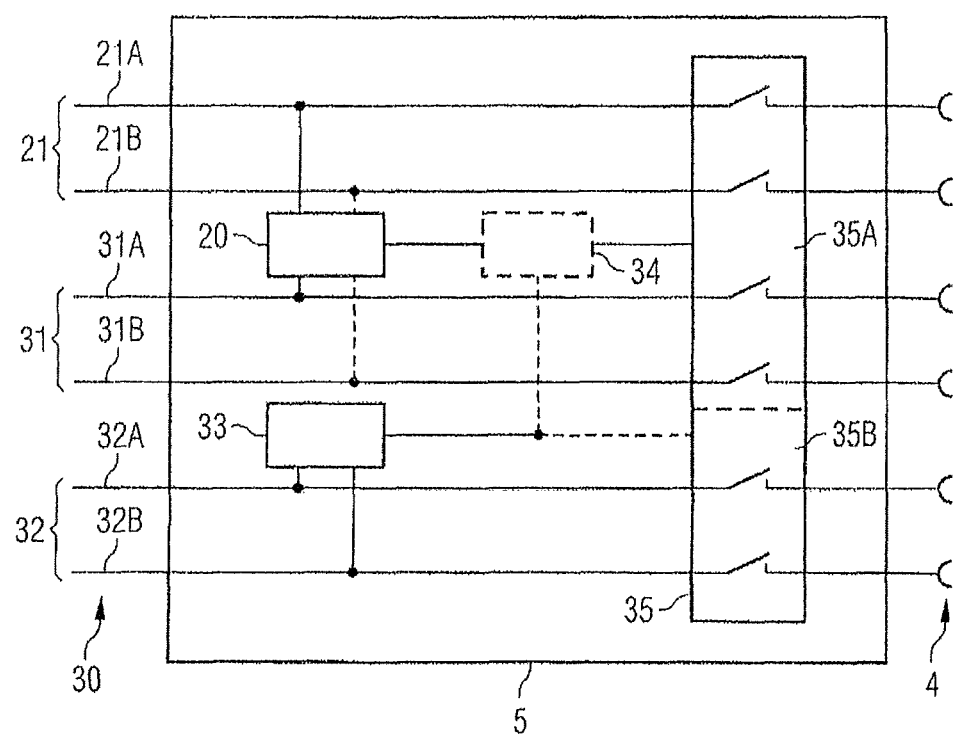
FIG. 3 shows a schematic illustration of an interface monitoring apparatus for simultaneously monitoring different data lines.

FIG. 3 shows a schematic arrangement of an interface monitoring apparatus 5 to simultaneously monitor data lines for signaling based on the USB 2.0 and USB 3.0 standards. The monitoring apparatus 5 has inputs 30 for two first data lines 21A and 21B from a first differential wire pair 21 to transfer data from an interface chip 6 (not shown) to a peripheral device 2 (not shown) connected to an interface port 4. Furthermore, the interface monitoring apparatus 5 has two second data lines 31A and 31B from a second differential wire pair 31 to receive data from the peripheral device 2 to forward to the interface chip 6. The wire pairs 21 and 31 transfer data at a high speed, particularly more than 500 Mbit/s, e.g., 5 Gbit/s. Finally, the interface monitoring apparatus 5 has two third data lines 32A and 32B from a third differential wire pair 32 to bidirectionally transfer data between the interface chip 6 and the peripheral device 2 at a lower speed, for example, 480 Mbit/s or less.

The monitoring apparatus 5 has a first monitoring circuit 20 and a second monitoring circuit 33. The first monitoring circuit 20 monitors the termination of at least one of the first data line 21A or 21B and, by way of example, corresponds to the first monitoring circuit 20 shown in FIG. 2. Alternatively or in addition, the first monitoring circuit 20 can also monitor one of the second data lines 31A or 31B. It goes without saying that there may also be a further monitoring circuit provided to monitor one or both of the second data lines 31A and 31B. The second monitoring circuit 33 monitors the activity on the third data lines 32A and 32B. In particular, the second monitoring circuit 33 monitors whether data transfer takes place via the differential line pair with the third data lines 33A and 33B, as disclosed in DE 10 2008 035 103 A1, for example.

Peripheral devices 2 based on the USB standard will transfer data either via the first and second data lines 21A and 21B and also 31A and 31B or via the third data lines 33A and 33B. By contrast, there is no provision for simultaneous transfer of data via all of the wire pairs 21, 31, 32 on the basis of the USB 3.0 standard. Accordingly, at least one of the monitoring circuits 20 and 33 respectively signals a control signal which indicates that the respective associated wire pairs 21 and 31 or 32 are not being used. If a USB 2.0 device connects to a USB 3.0 host adapter, for example, the first and second data lines 21A, 21B, 31A and 31B are not terminated by the USB 2.0 device, and the first monitoring circuit 20 delivers a first control signal. When a USB 3.0 device connects to a USB 3.0 host adapter, on the other hand, communication takes place exclusively via the first data lines 21A and 21B and also second data lines 31A and 31B, whereas no information is transferred via the third data lines 32A and 32B. Accordingly, the second monitoring circuit 33 delivers a second control signal in this case.

To prevent unintentional detection of disconnection of the USB peripheral device 2 from the interface port 4 in these cases, the interface monitoring apparatus 5 shown in FIG. 3 comprises an optional logic circuit 34 which logically combines the first control signal from the first monitoring circuit 20 with the second control signal from the second monitoring circuit 33. In particular, the logic circuit 34 outputs a control signal that permanently deactivates the interface port 4 to a common deactivation circuit 35 only when both the first control signal from the first monitoring circuit 20 and the second control signal from the second monitoring circuit 33 indicate that the respective associated data lines 21A, 21B, 31A, 31B, 32A and 32B are not being used.

Alternatively, it is also possible to provide separate deactivation circuits 35A and 35B for the data lines 21A, 21B, 31A and 31B or 32A and 32B. In this case, it is possible to dispense with the logic circuit 34. However, it is then not possible to change the mode of operation of a host adapter 8 or a peripheral device 2 connected thereto during operation. In the current USB 3.0 standard, there is no provision for such changing of the mode of operation.

Figure 4:
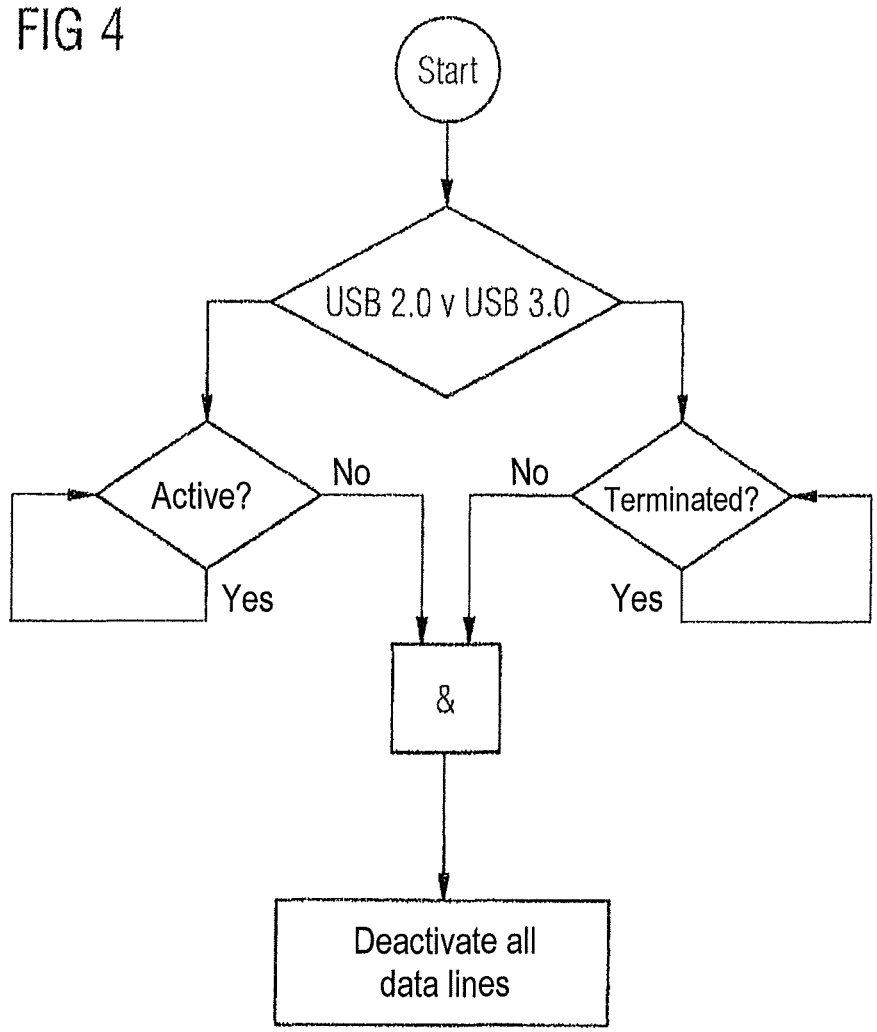
FIG. 4 shows a schematic illustration of the method of operation for the combined monitoring of different data lines.

The logic combination of the individual monitoring and security components of the interface monitoring apparatus 5 is once again shown schematically in FIG. 4. In addition to the logic combination of the first and second control signals by the logic circuit 34, this figure also reveals that an original device identifier based on the USB 2.0 standard or the USB 3.0 standard is taken as a basis of performing different security checks. These are described in detail later with reference to FIG. 6.

Figure 5:
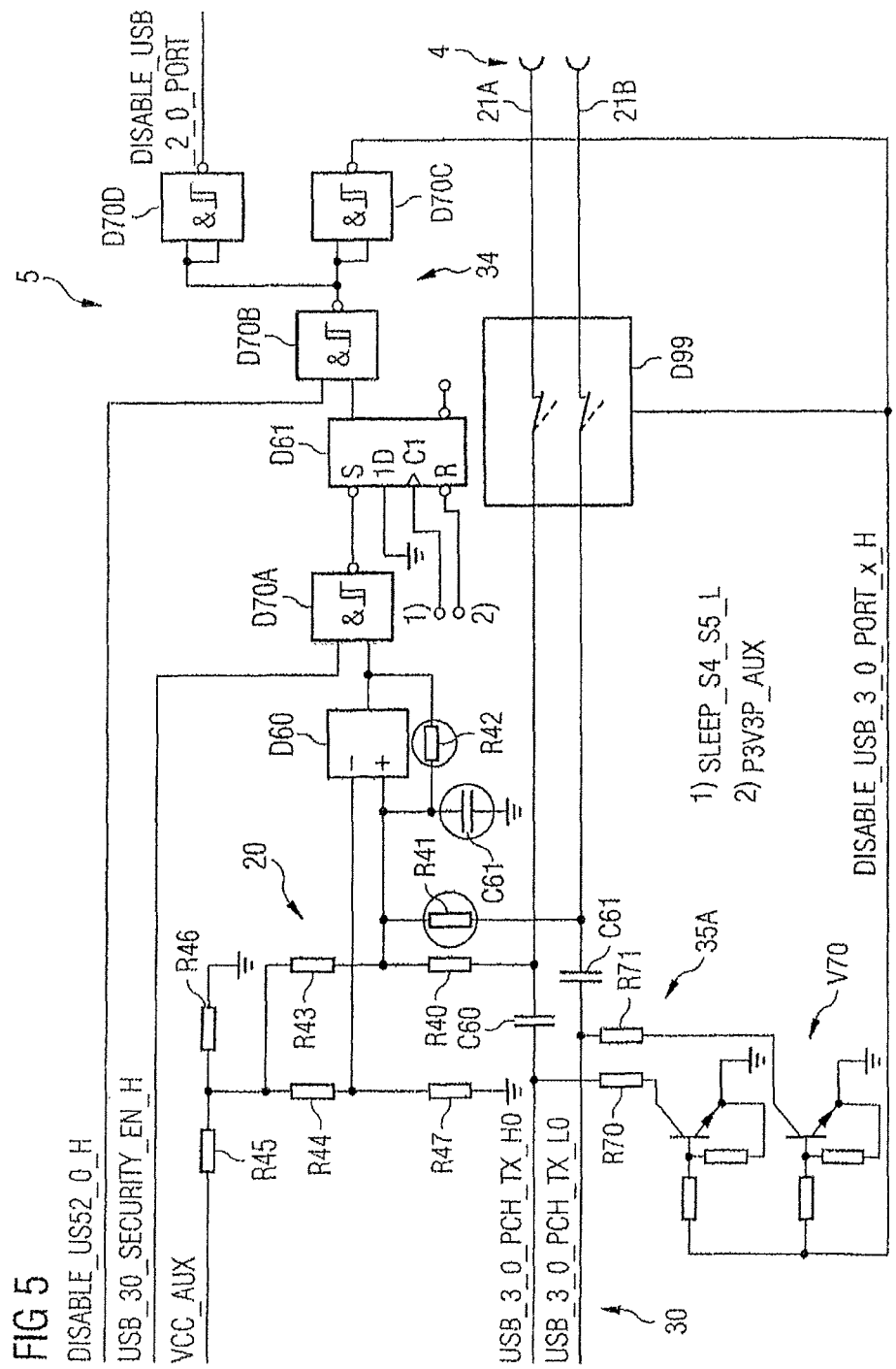
FIG. 5 shows a detailed circuit diagram of an interface monitoring apparatus.

FIG. 5 shows a detailed circuit diagram for an interface monitoring apparatus 5. Besides the first monitoring circuit 20 already described with reference to FIG. 2, the interface monitoring apparatus 5 particularly comprises a detailed illustration of the deactivation circuit 35 and of the logic circuit 34. By contrast, the second monitoring circuit 33 that monitors the data lines D+ and D− based on the USB 2.0 standard is not shown in FIG. 5 to preserve the clarity thereof. Instead, the logic circuit 34 shown in FIG. 5 is merely supplied with a control signal DISABLE_USB2_0_H which indicates that the second monitoring circuit 33 has been initiated on account of inactivity on the third data lines 32A and 32B.

The logic circuit 34 essentially comprises four logic gates D70A to D70D and a flipflop chip D61. The first logic gate D70A receives a further control signal USB_30_SECURITY_EN_H which indicates whether the monitoring circuit 20 has been activated in principle. By way of example, this signal is provided by a BIOS chip 7 during booting. The flipflop chip D61 stores the state of the monitoring circuit 20 after it has been initiated, and particularly prevents the monitoring circuit 20, once initiated, from being reset by the operating system or another software component. Monitoring by the flipflop chip is interrupted only when the computer system 1 enters a sleep state, which necessitates reinitialization of the interface ports 4. Examples of this are the ACPI states S4 (Hibernate) and S5 (Soft-off). To this end, a control signal SLEEP_S4-S5_L is provided via a clock input of the flipflop D61. A final control signal P3V3P_Aux is finally used to reset the flipflop D61 when an auxiliary voltage from the computer system 1 is provided for the first time. This is the case particularly when the computer system is reset or restarted. The subsequent second logic gate D70B is used to logically combine the control signal from the first monitoring circuit 20, which control signal is buffered by the flipflop chip D61, and the monitoring signal from the second monitoring circuit 33.

A third logic gate D70C supplies the combined control signal from the deactivation circuit 35A to permanently deactivate the first data lines 21A and 21B. A further logic gate D70D also supplies the same control signal to a further circuit—again not shown in FIG. 5—to deactivate the third data lines 32A and 32B based on the USB 2.0 protocol.

The deactivation circuit 35A pulls down the first data lines 21A and 21B to a predetermined reference potential, particularly the ground potential, at the input 30 for connection to the interface chip 6 (not shown) via two transistors V70 and pull-down resistors R70 and R71. This means that communication between a peripheral device 2 (not shown) and the interface chip 6 via the data lines 21A and 21B coupled via the capacitor C60 or C61 is no longer possible.

In FIG. 5, a high frequency switching element D99 is provided as an alternative to the deactivation circuit 35A. The high frequency switching element D99 is looped into the first data lines 21A and 21B either upstream or downstream of the capacitive elements C60 and C61 and likewise interrupts communication between the interface port 4 and the interface chip 6.

The specific implementation of the monitoring circuit 20 shown in FIG. 5 differs from the schematic illustration of the monitoring circuit 20 shown in FIG. 2 particularly by virtue of the simultaneous monitoring of both of the first data lines 21A and 21B. As indicated by the circle around the resistor R41, fitting this component is optional, however, since termination at both ends by a peripheral device 2 means that monitoring a single data line 21A or 21B is sufficient to detect disconnection.

The interface monitoring can be improved still further if, in addition to the connection and disconnection of peripheral devices 2, the device class thereof is also checked by a security component. The starting operation for the computer system 1 with the interface monitoring apparatus 5 contained therein for such an improved refinement is once again shown schematically in FIG. 6.

When the computer system 1 is switched on or restarted, a starting operation takes place under the control of the BIOS 7. This is shown in step 61.

In a step 62, a stored setting is used to check whether or not interface monitoring of peripheral devices based on the USB 3.0 specification is required. If no interface monitoring is required, all interface ports 4 are enabled and the interface monitoring apparatus 5 remains deactivated.

If interface monitoring is required, all interface ports 4 are initialized in step 63 and the peripheral devices 2 connected thereto are checked. In this case, the interface ports 4 to which no peripheral device 2 is connected are deactivated permanently. Furthermore, the interface ports 4 on which an inadmissible device type, for example, a mass storage device or USB hub, has been identified are deactivated permanently.

Deactivation is shown as step 64. Preferably, the first deactivation circuit 35A is used for deactivation. Alternatively, it is possible for the relevant interface ports 4 not to be reported to an operating system by the BIOS 7 or to be deactivated directly in the interface chip 6, for example, in a southbridge or an I/O controller hub.

For the remaining interface ports 4, the interface monitoring apparatus 5 is initialized. By way of example, the signal SEC or USB_30_SECURITY_EN_H is set to a high logic level. Therefore, in a step 65, the termination of the data lines 21A and/or 21B from the activated interface ports 4 is subsequently monitored. If the termination of the data lines 21A or 21B is interrupted or if the output impedance of the data port 4 rises above a predetermined reference value then the associated interface port 4 is deactivated permanently in step 64. This is done by using the deactivation circuit 35A, the blocking of which can no longer be cancelled by software, particularly by an operating system.

Furthermore, step 66 monitors whether a change is made to another mode of operation of the computer system 1. In the event of a change to what is known as the "S3 standby state," that is to say a state in which although a processor is stopped, the system is not restarted, the interface monitoring continues to be active. In the event of a change to an idle state, which is further below that in terms of energy, for example, one of the ACPI states S4, S5 or G3, a subsequent system restart takes place in each case. In this case, the BIOS again undertakes the check on the individual interface ports 4 in step 61. It is therefore possible to dispense with continuing monitoring in these cases, and the circuit is reset.

Hence, the circuit arrangement described herein and the method described provide comprehensive protection against connection of unapproved peripheral devices 2 based on the USB standard 2.0 or 3.0 to the interface ports 4. In this case, the circuit is of relatively simple design. In particular, the interface monitoring apparatus 5 does not require any microcontroller. Furthermore, following the activation of the interface monitoring apparatus, there is also no need to resort to the BIOS chip 7 and hence no need for any software control.

The invention claimed is:

1. An interface monitoring apparatus for an interface port that connects a peripheral device to an interface chip by at least one first data line comprising:
   a capacitor arranged between the interface chip and the interface port and configured to capacitively couple the first data line to the interface chip,
   a first monitoring circuit coupled to the first data line at a node arranged between the capacitor and the interface port and configured to monitor at least one device-end termination of the first data line and provide a first control signal in the event of identifying that a termination for the first data line is not present,
   a first deactivation circuit that permanently stops data traffic via the first data line of the interface port until the interface monitoring apparatus is reset when the first control signal has been provided by the first monitoring circuit, and
   a first voltage divider, a second voltage divider and a comparator, wherein 1) the first voltage divider connects between a supply voltage potential and a reference potential and provides, at a first internal node, a reference voltage, 2) the second voltage divider connects between the supply voltage potential and the node of the data line arranged between the capacitor and the interface port and provides, at a second internal node, a voltage level dependent on the output impedance of the at least one first data line, and 3) the comparator compares the reference voltage provided by the first voltage divider with the voltage level provided by the second voltage divider to detect a current flowing through the second voltage divider from the supply voltage potential to the device-end termination to determine the output impedance of the at least one first data line.

2. The apparatus according to claim 1, wherein the first monitoring circuit determines an output impedance of the at least one first data line and provides the first control signal in the event of a predetermined threshold value for the output impedance being exceeded.

3. The apparatus according to claim 1, wherein the first monitoring circuit determines a combined output impedance of the at least one first data line and at least one second data line and provides the first control signal in the event of a predetermined threshold value for the combined output impedance being exceeded.

4. The apparatus according to claim 3, further comprising a second monitoring circuit coupled to at least one third data line and configured to monitor an activity on the at least one third data line and provide a second control signal in the event of identifying that an activity is not present on the at least one third data line, wherein the transfer of data via at least one third data line is independent of the transfer of data via the at least one first data line.

5. The apparatus according to claim 4, wherein the first deactivation circuit permanently stops the data traffic via the at least one first data line and the at least one third data line of the interface port only when the first monitoring circuit provides the first control signal and the second monitoring circuit provides the second control signal simultaneously.

6. The apparatus according to claim 4, further comprising a second deactivation circuit that permanently stops the data traffic via the at least one third data line of the interface port until the interface monitoring apparatus is reset when the second control signal has been provided by the second monitoring circuit.

7. The apparatus according to claim 1, wherein the interface monitoring apparatus is in the form of a discrete hardware circuit and at least the first monitoring circuit operates functionally independently of software control of the interface port.

8. The apparatus according to claim 1, wherein the interface monitoring apparatus monitors a plurality of interface ports, and for each interface port a first monitoring circuit and/or first deactivation circuit associated with the respective interface port is provided.

9. A USB host adapter having at least one USB interface port that connects a peripheral device to an interface chip by at least one first data line, the USB host adapter comprising an interface monitoring apparatus, the interface monitoring apparatus comprising:
   a capacitor arranged between the interface chip and the interface port and which capacitively couples the at least one first data line to the interface chip,
   a first monitoring circuit coupled to the first data line at a node arranged between the capacitor and the interface port, configured to monitor at least one device-end termination of the first data line and provide a first control signal in the event of identifying that a termination for the first data line is not present,
   a first deactivation circuit that permanently stops data traffic via the first data line of the interface port until the interface monitoring apparatus is reset when the first control signal has been provided by the first monitoring circuit, and
   a first voltage divider, a second voltage divider and a comparator, wherein 1) the first voltage divider connects between a supply voltage potential and a reference potential and provides, at a first internal node, a reference voltage, 2) the second voltage divider connects between the supply voltage potential and the node of the data line arranged between the capacitor and the interface port and provides, at a second internal node, a voltage level dependent on the output impedance of the at least one first data line, and 3) the comparator compares the reference voltage provided by the first voltage divider with the voltage level provided by the second voltage divider to detect a current flowing through the second voltage divider from the supply voltage potential to the device-end termination to determine the output impedance of the at least one first data line.

10. The host adapter according to claim 9, wherein the USB interface port has at least one first differential wire pair, comprising the at least one first data line, and a second differential wire pair to simultaneously send and receive data at a first speed and has a third differential wire pair that randomly sends or receives data at at least one second speed.

11. The host adapter according to claim 9, wherein, when the host adapter is started, a device class for a peripheral device connected to the interface port is ascertained and compared with a list of admissible device classes, and monitoring of the interface port is activated by the first monitoring circuit in the event of a peripheral device in an admissible class being identified, and the interface port is deactivated by the first deactivation circuit in the event of a peripheral device with an inadmissible device class being identified.

12. The host adapter according to claim 10, wherein, when the host adapter is started, a device class for a peripheral device connected to the interface port is ascertained and compared with a list of admissible device classes, and monitoring of the interface port is activated by the first monitoring circuit in the event of a peripheral device in an admissible class being identified, and the interface port is deactivated by the first deactivation circuit in the event of a peripheral device with an inadmissible device class being identified.

13. The apparatus according to claim 3, wherein the interface monitoring apparatus is in the form of a discrete hardware circuit and at least the first monitoring circuit operates functionally independently of software control of the interface port.

14. The apparatus according to claim 2, wherein the interface monitoring apparatus is in the form of a discrete hardware circuit and at least the first monitoring circuit operates functionally independently of software control of the interface port.

15. The apparatus according to claim 4, wherein the interface monitoring apparatus is in the form of a discrete hardware circuit and at least the first monitoring circuit operates functionally independently of software control of the interface port.

16. The host adapter according to claim 9, wherein the first monitoring circuit determines an output impedance of the at least one first data line and provides the first control signal in the event of a predetermined threshold value for the output impedance being exceeded.

17. The apparatus according to claim 1, wherein the first monitoring circuit determines a combined output impedance of at least two data lines of two separate differential wire pairs in accordance with the USB 3.0 specification.

18. The apparatus according to claim 1, wherein the first monitoring circuit determines an output impedance of at least one data line of a first differential wire pair in accordance with the USB 3.0 specification and a second monitoring circuit coupled to another data line of another differential wire pair in accordance with the USB 2.0 specification, which monitors activity on the another data line.

* * * * *